US010902284B2

(12) United States Patent
Palanichamy et al.

(10) Patent No.: US 10,902,284 B2
(45) Date of Patent: Jan. 26, 2021

(54) IDENTIFYING OPTIMUM PRE-PROCESS TECHNIQUES FOR TEXT EXTRACTION

(71) Applicant: HCL Technologies Limited, Noida (IN)

(72) Inventors: Banumathi Palanichamy, Chennai (IN); Ameli Merlin Soundararajan, Chennai (IN); Selvaraj Thangaraj, Chennai (IN); Yuvarajan Shanmugasundaram, Chennai (IN); Siva Sakthivel Sadasivam, Chennai (IN)

(73) Assignee: HCL TECHNOLOGIES LIMITED

( * ) Notice: Subject to any disclaimer, the term of this patent is extended or adjusted under 35 U.S.C. 154(b) by 257 days.

(21) Appl. No.: 15/985,645

(22) Filed: May 21, 2018

(65) Prior Publication Data

US 2018/0349733 A1    Dec. 6, 2018

(30) Foreign Application Priority Data

May 31, 2017    (IN) .............................. 201711019176

(51) Int. Cl.
*G06K 9/62* (2006.01)
*G06K 9/72* (2006.01)
*G06K 9/46* (2006.01)
*G06K 9/54* (2006.01)
*G06K 9/32* (2006.01)
(Continued)

(52) U.S. Cl.
CPC .......... *G06K 9/623* (2013.01); *G06K 9/00456* (2013.01); *G06K 9/325* (2013.01); *G06K 9/36* (2013.01); *G06K 9/468* (2013.01); *G06K 9/54* (2013.01); *G06K 9/6262* (2013.01); *G06K 9/72* (2013.01); *G06K 2209/01* (2013.01)

(58) Field of Classification Search
CPC .......... G06K 9/623; G06K 9/72; G06K 9/468; G06K 9/54; G06K 2209/01; G06K 9/325; G06K 9/36; G06K 9/6262; G06K 9/00456
See application file for complete search history.

(56) References Cited

U.S. PATENT DOCUMENTS

| 5,883,986 A | 3/1999 | Kopec et al. |
| 8,897,563 B1 | 11/2014 | Welling et al. |
| 9,412,052 B1 | 8/2016 | Natarajan et al. |

(Continued)

*Primary Examiner* — Yon J Couso
(74) *Attorney, Agent, or Firm* — HM Law Group LLP; Vani Moodley, Esq (57) ABSTRACT

Disclosed is a system for identifying at least one optimum pre-processing technique for text extraction. A data receiving module receives an input image and an expected text pertaining to the input image. Furthermore, a performance module performs a plurality of pre-processing techniques on the input image in order to extract textual information, present in the input image, by using at least one text extraction technique. Subsequently, a recording module records processing time spent on each pre-processing technique performed on the input image. Further, a comparison module compares the textual information with the expected text. Further to comparing the textual information with the expected text, the ranking module may rank each of the plurality of pre-processing techniques based on a result of comparison between the textual information and the expected text, thereby identifying at least one optimum pre-processing technique for text extraction.

15 Claims, 5 Drawing Sheets

(51) Int. Cl.
*G06K 9/36* (2006.01)
*G06K 9/00* (2006.01)

(56) References Cited

U.S. PATENT DOCUMENTS

| | | | |
|---|---|---|---|
| 9,858,492 B2 | 1/2018 | Bhardwaj et al. | |
| 2008/0301070 A1* | 12/2008 | Bartlett | G06K 9/6248 706/12 |
| 2014/0064622 A1* | 3/2014 | Newell | G06K 9/6292 382/195 |
| 2017/0374093 A1* | 12/2017 | Dhar | H04L 63/1433 |

* cited by examiner

IDENTIFYING OPTIMUM PRE-PROCESS TECHNIQUES FOR TEXT EXTRACTION

PRIORITY INFORMATION

The present application claims priority from Indian Patent Application No. 201711019176 filed on 31 May 2017 the entirety of which is hereby incorporated by reference.

TECHNICAL FIELD

The present subject matter described herein, in general, relates to text extraction and more particularly to identifying at least one optimum pre-processing technique for the text extraction.

BACKGROUND

In many organizations huge amount of time is spent on unnecessary tasks such as referring to many hardcopies for inputting data and searching through piles of documents in order to retrieve necessary information to complete a particular assignment. In order to reduce the huge amount of time, currently, every organization may convert the documents into an image. Upon converting, a pre-processing technique may be applied to the image in order to extract textual information present in the image. However, extracted textual information may not be accurate. This is because a set of properties belonging to an image is different from the set of properties belonging to another image. Thus the pre-processing technique applied to one image may not be applicable on the other image. Hence, there exists a challenge in identifying an optimum pre-processing technique corresponding to each image for text extraction.

SUMMARY

Before the present systems and methods, are described, it is to be understood that this application is not limited to particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for identifying at least one optimum pre-processing technique for text extraction and the concepts are further described below in the detailed description. This summary is not intended to identify essential features of the claimed subject matter nor is it intended for use in determining or limiting the scope of the claimed subject matter.

In one implementation, a method for identifying at least one optimum pre-processing technique for text extraction is disclosed. In order to identify at least one optimum pre-processing technique for text extraction, initially, an input image and an expected text pertaining to the input image may be received. Upon receiving the input image and the expected text, each of a plurality of pre-processing techniques may be performed on the input image in order to extract textual information present in the input image. In one aspect, the textual information may be extracted by using at least one text extraction technique. Subsequent to performing the plurality of pre-processing techniques, processing time spent may be recorded on each pre-processing technique performed on the input image. Upon recording the processing time, the textual information may be compared with the expected text. Furthermore, each pre-processing technique may be ranked based on a result of comparison and the processing time recorded, thereby identifying at least one optimum pre-processing technique for text extraction. In another aspect, the aforementioned method for identifying at least one optimum pre-processing technique for text extraction may be performed by a processor using programmed instructions stored in a memory.

In another implementation, a system for identifying at least one optimum pre-processing technique for text extraction is disclosed. The system may comprise a processor and a memory coupled to the processor. The processor may execute a plurality of modules present in the memory. The plurality of modules may comprise a data receiving module, a performance module, a recording module, a comparison module, and a ranking module. The data receiving module may receive an input image and an expected text pertaining to the input image. Further to receiving the input image and the expected text, the performance module may perform each of a plurality of pre-processing techniques on the input image in order to extract textual information present in the input image. In one aspect, the textual information may be extracted by using at least one text extraction technique. Meanwhile, the recoding module may record processing time spent on each pre-processing technique performed on the input image. Subsequently, the comparison module may compare the textual information with the expected text. Upon comparison, the ranking module may rank each pre-processing technique based on a result of the comparison and the processing time recorded thereby identifying at least one optimum pre-processing technique for text extraction.

In yet another implementation, non-transitory computer readable medium embodying a program executable in a computing device for identifying at least one optimum pre-processing technique for text extraction is disclosed. The program may comprise a program code for receiving an input image and an expected text pertaining to the input image. The program may further comprise a program code for performing each of a plurality of pre-processing techniques on the input image in order to extract textual information present in the input image. In one aspect, the textual information may be extracted by using at least one text extraction technique. The program may further comprise a program code for recording processing time spent on each pre-processing technique performed on the input image. The program may further comprise a program code for comparing the textual information with the expected text. The program may further comprise a program code for ranking each pre-processing technique based on a result of comparison and the processing time recorded, thereby identifying at least one optimum pre-processing technique for text extraction.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "receiving," "performing," "recording," "comparing," "ranking," and "storing," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention identifies at least one optimum pre-processing technique for text extraction. In order to do so, initially, an input image and an expected text may be received. It may be understood that the input image may comprise image list, cropped image, cluster of images and others. It may be noted that one input image may differ from another input image based upon a parameter of the input image. In one aspect, the parameter may comprise luminosity, pixel density, brightness, color band, haziness, quality and others. Upon receipt of the input image, a pre-processing technique, of a plurality of pre-processing techniques, may be performed on the input image. Examples of the plurality of pre-processing techniques may include, but not limited to, grayscale, invert, threshold, skew, bilinear, bipolar, and interpolation.

Further to performing the pre-processing technique, textual information present in the input image may be extracted. It may be noted that extraction of the textual information may be carried out by using an Optical Character Recognition (OCR) method, a texture based method, a morphological method and alike. Furthermore, processing time spent on each pre-processing technique performed on the input image may be recorded. Subsequently, the textual information may be compared with the expected text. It may be understood that a result of comparison of the textual information with the expected text may indicate an amount of the textual information matched with the expected text. In one aspect, the result determined based on the comparison may be indicated by a matching percentage when the pre-processing technique is performed on the input image. Similarly, each other pre-processing technique is performed on the input image to determine the matching percentage corresponding to each pre-processing technique.

In addition, each of the plurality of pre-processing techniques when performed on the input image, may be ranked based upon the result of the comparison and the processing time recorded. It may be understood that the pre-processing technique, of the plurality of pre-processing techniques, having a highest matching percentage and the lowest processing time may be ranked as first. Whereas, the pre-processing technique, of the plurality of pre-processing techniques, having a lowest matching percentage and the highest processing time may be ranked as last. Thus, guiding a user to identify the at least one optimum pre-processing technique for text extraction. While aspects of described system and method for identifying at least one optimum pre-processing technique for text extraction and may be implemented in any number of different computing systems, environments, and/or configurations, the embodiments are described in the context of the following exemplary system.

Figure 1:
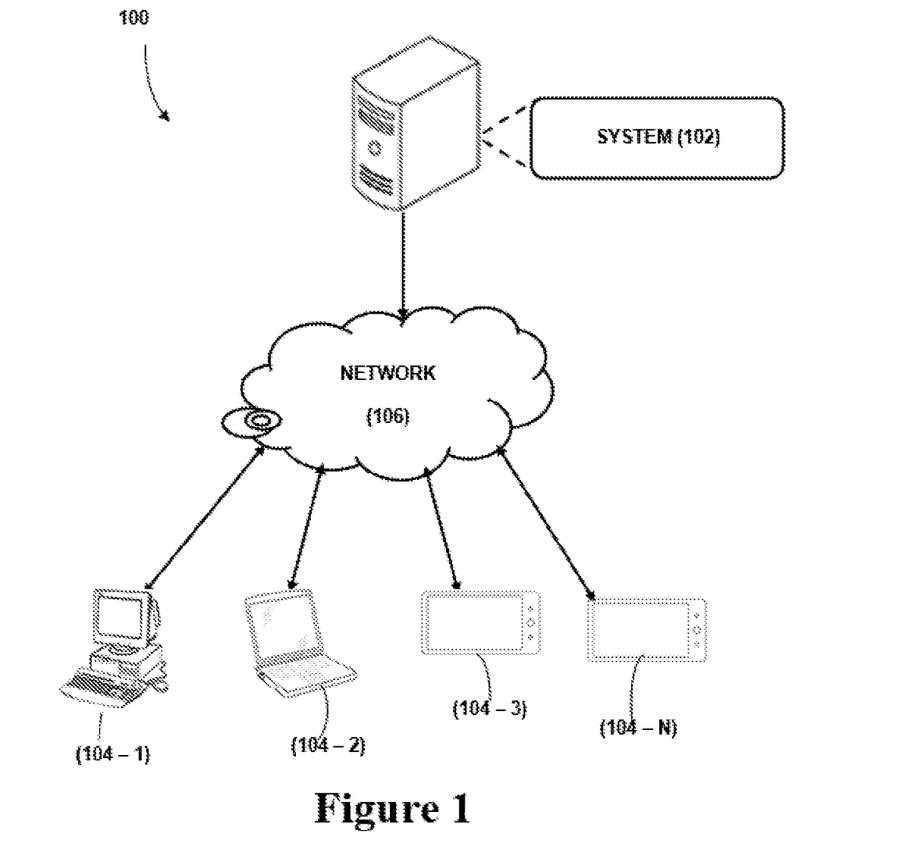
FIG. 1 illustrates a network implementation of a system for identifying at least one optimum pre-processing technique for text extraction, in accordance with an embodiment of the present subject matter.

Referring now to FIG. 1, a network implementation 100 of a system 102 for identifying at least one optimum pre-processing technique for text extraction is disclosed. In order to identify the at least one optimum pre-processing technique for text extraction, initially, the system 102 may receive an input image and an expected text pertaining to the input image. Upon receiving the input image and the expected text, the system 102 may perform each of a plurality of pre-processing techniques on the input image in order to extract textual information present in the input image. In one aspect, the textual information may be extracted by using at least one text extraction technique. Subsequent to performing each of the plurality of pre-processing techniques, the system 102 may record processing time spent on each pre-processing technique performed on the input image. Upon recording the processing time spent, the system 102 may compare the textual information with the expected text. Furthermore, the system 102 may rank each pre-processing technique based on a result of comparison and the processing time recorded, thereby identifying the at least one optimum pre-processing technique for text extraction.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications.

Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
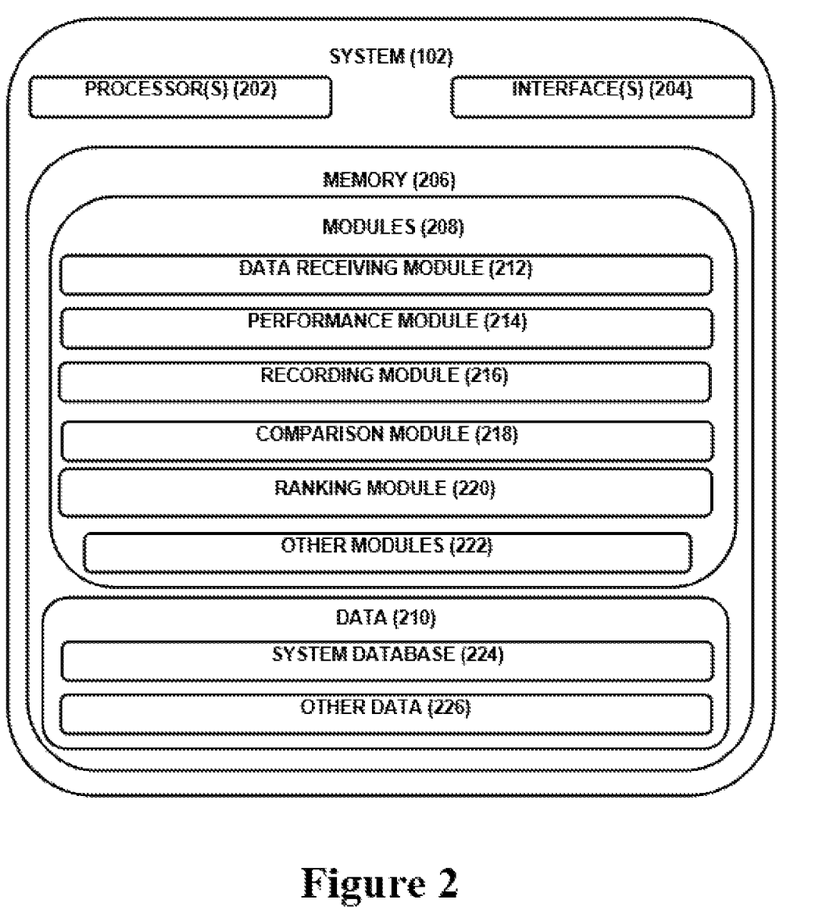
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a data receiving module 212, a performance module 214, a recording module 216, a comparison module 218, a ranking module 220, and other modules 222. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 224 and other data 226. The other data 226 may include data generated as a result of the execution of one or more modules in the other modules 222.

As there are various challenges observed in the existing art, the challenges necessitate the need to build the system 102 for identifying at least one optimum pre-processing technique for text extraction. In order to identify at least one optimum pre-processing technique for text extraction, at first, a user may use the client device 104 to access the system 102 via the I/O interface 204. The user may register them using the I/O interface 204 in order to use the system 102. In one aspect, the user may access the I/O interface 204 of the system 102. The system 102 may employ the data receiving module 212, the performance module 214, the recording module 216, the comparison module 218, and the ranking module 220. The detail functioning of the modules is described below with the help of figures.

The present system 102 identifies at least one optimum pre-processing technique for text extraction. To do so, initially, the data receiving module 212 receives an input image and an expected text pertaining to the input image. It may be understood that the data receiving module 212 may receive the input image and the expected text pertaining to the input image from at least a user, a database, a cloud server and others. The input image may comprise one or more parameters, including but not limited to, luminosity, pixel density, brightness, color band, haziness, and quality. It may be understood that one input image may differ from another input image based upon the one or more parameters. Examples of the input image may be a scanned image, a photograph, a screenshot, and alike.

Further to receiving the input image and the expected text pertaining to the input image, the performance module 214 performs each of a plurality of pre-processing techniques on the input image in order to extract textual information present in the input image. Example of the pre-processing techniques may include, but not limited to, a grayscale technique, an invert technique, a threshold technique, a skew technique, a bilinear technique, a bipolar technique, and an interpolation technique.

Subsequent to performing each of the plurality of pre-processing technique, the performance module 214 may detect the textual information present in the input image. Further to detection of the textual information, the performance module 214 may utilize at least one text extraction technique to extract the textual information present in the input image. Example of the at least one text extraction technique may include, but not limited to, an optical Character Recognition (OCR) method, a texture based method, and a morphological method.

Further, the recording module 216 records processing time spent on each pre-processing technique performed on the input image. It may be noted that the processing time spent is a duration of time required to perform one pre-processing technique on the input image. It may also be noted that processing time spent on one pre-processing technique performed on the input image may be different from processing time spent on another pre-processing technique performed on the input image.

Further to recording the processing time, the comparison module 218 compares the textual information with the expected text. It may be noted that a result of a comparison, of the textual information with the expected text, may indicate an amount of the textual information matched with the expected text for a pre-processing technique, of the plurality of pre-processing technique, when performed on the input image. In one aspect, the result determined based on the comparison may be indicated by a matching percentage when the pre-processing technique is performed on the input image.

Subsequent to the comparison of the textual information with the expected text, the ranking module 220 ranks each pre-processing technique based on the result of comparison and the processing time recorded. In one embodiment, the ranking module 220 may rank the pre-processing technique, of the plurality of pre-processing techniques, as an optimized pre-processing technique, when the pre-processing technique is having the amount greater than other amounts associated to other pre-processing techniques and the processing time is less than other processing times associated to the other pre-processing techniques.

In another embodiment, the ranking module 220 may generate a report comprising the each of the plurality of pre-processing techniques, when performed on the input image, and the parameter of the input image. It may be understood that the pre-processing technique having a highest matching percentage and the lowest processing time may be ranked as first. Whereas, the pre-processing technique having a lowest matching percentage and the highest processing time may be ranked as last. Furthermore, one or more pre-processing techniques, of the plurality of the pre-processing techniques, may be ranked based on the matching percentage. It may be understood that the one or more pre-processing techniques may be ranked based upon a predefined threshold of the matching percentage. Thus, the one or more pre-processing techniques with the matching percentage greater than the threshold may be identified as an optimum pre-processing techniques for text extraction.

Subsequent to ranking of the one or more pre-processing techniques, the ranking module 220 may store the one or more pre-processing techniques and the processing time recorded corresponding to the input image. In one aspect, the one or more pre-processing techniques and the processing time recorded may be stored in the system database 224 so as to perform at least one of the one or more pre-processing techniques on another image having a parameter same as the input image. It may be understood that storing of the one or more pre-processing techniques and the processing time recorded in the system database 224, as identified based on the result of the comparison, corresponding to the input image may be a one-time process used to train the system 102 for identifying the at least one optimum pre-processing technique for text extraction.

Figure 3:
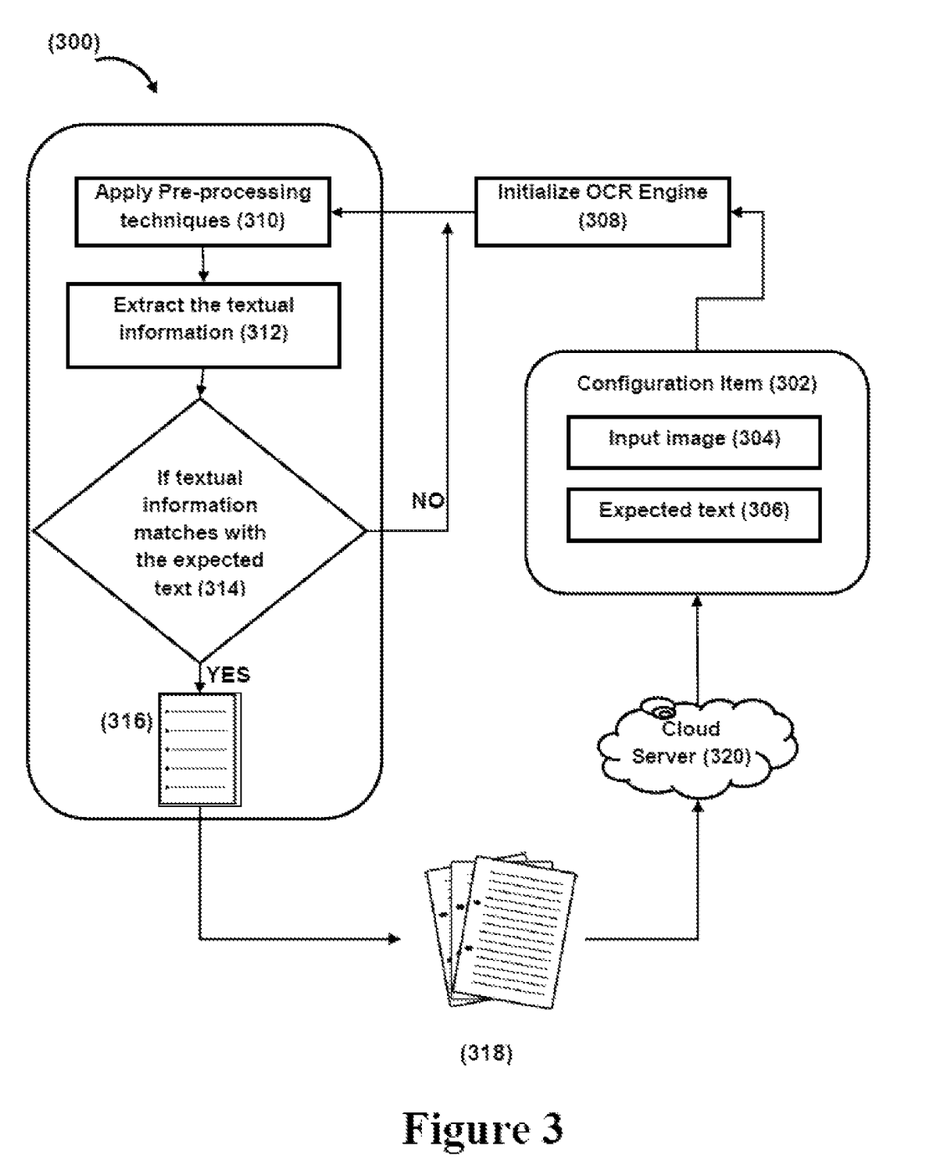
FIG. 3 illustrates a workflow of the system for identifying at least one optimum pre-processing technique for text extraction, in accordance with an embodiment of the present subject matter.

In order to elucidate further, now consider FIG. 3, a workflow 300 of the system 102 for identifying at least one optimum pre-processing technique for text extraction is shown, in accordance with an embodiment of the present subject matter. In order to identify the at least one optimum pre-processing technique, initially, a configuration item 302 comprising an input image 304 and an expected text 306 pertaining to the input image 304 may be received. Further to receiving the configuration item 302, any textual information present in the input image may be detected. Further to detection of the textual information, a region of the textual information may be marked. Furthermore, the configuration item 302 may identify one or more pre-process engines for extracting the textual information. Subsequently, at step 308, an OCR engine, an example of one or more pre-process engines, may be initialized for processing the input image. After initializing the OCR engine, at step 310, each of a plurality of pre-processing techniques may be applied to the input image. Upon applying each of the plurality of pre-processing techniques, at step 312, textual information present in the input image may be extracted by using at least one text extraction techniques. Subsequently, processing time spent may be recorded on performing each pre-processing technique performed on the input image.

Furthermore, at step 314, the textual information may be compared with the expected text in order to verify matching between the textual information and the expected text. In one aspect, a result of a comparison of the textual information with the expected text may be indicated as a matching percentage and the processing time recorded. At step 316, a list of one or more pre-processing techniques, of the plurality of pre-processing techniques, may be ranked based on a predefined threshold of the matching percentage and the processing time recorded. In one embodiment, when the textual information does not match with the expected text, system 102 may iteratively apply each pre-processing technique on the input image and rank each of the one or more pre-processing techniques based upon the predefined threshold of the matching percentage and the processing time recorded.

After ranking the list of the one or more pre-processing techniques, a report 318 may be generated. It may be noted that the report may comprise the one or more pre-processing techniques ranked based upon the predefined threshold of the matching percentage and the processing time recorded. Further at step 320, the report may be stored in the cloud server for future references. It may also be noted that the configuration item 302 may be updated based on the report stored in the cloud server. It may be understood that all aforementioned steps may be performed at least once for every input image having one or more different parameters. Once the system 102 is trained for every input image, having one or more different parameters, the system 102 may identify at least one optimum pre-processing technique, based on the report generated, for the corresponding input image with the parameter same as that of a new input image.

Figure 4:
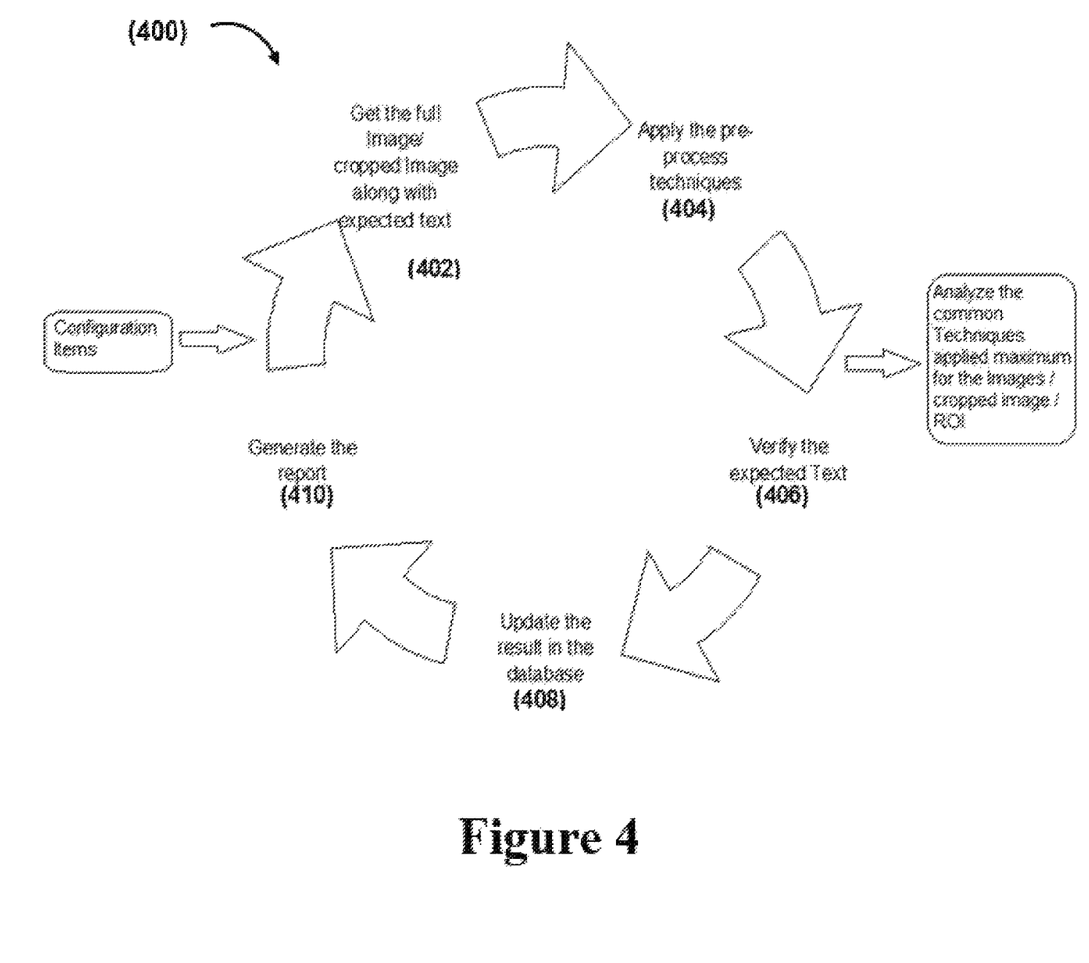
FIG. 4 illustrates a method for calculating performance from a regression testing, in accordance with an embodiment of the present subject matter.

In one example, the proposed system 102 may calculate performance from a regression testing. Referring now to FIG. 4, a method 400 for calculating performance from the regression testing is shown, in accordance with an embodiment of the present subject matter. In order calculate the performance from the regression testing, initially, at step 402, configuration items including, but not limited to, an input image and an expected text may be received by the system 102. The input image may comprise a full image, a cropped image, a screenshot and others. Further to receiving the input image and the expected text, at step 404, each pre-processing technique, of a plurality of pre-processing techniques may be applied to the input image. It may be understood that upon applying the plurality of pre-processing techniques, at least one text extraction technique may be performed to extract any textual information present in the image. Further, processing time spent on each pre-processing technique may be recorded. At step 406, the textual information may be verified with the expected text by comparing the textual information with the expected text. It may be noted that a result of a comparison and the processing time spent may be analyzed, and one or more pre-processing techniques, of the plurality of pre-processing techniques, showing maximum result may be identified. When the result of the comparison is below a threshold, the system 102 may iteratively perform aforementioned steps for each of the pre-processing techniques, of plurality of pre-processing techniques. At step 408, a result of the comparison and the processing time spent may be updated in the database. Further, at step 410, a report comprising the one or more pre-processing techniques, the expected text, the textual information extracted, and the processing time spent may be generated. In addition, the report may further be provided as an input to the configuration item so as to identify the at least one optimum pre-processing technique for text extraction for another input image with parameters same as that of the input image. It may be noted that the report indicates performance of one pre-processing technique performed on the input image when compared with another pre-processing technique performed on the input image. It may also be noted that the matching percentage and the processing time spent are identified as performance parameters for identifying at least one optimum pre-processing technique for text extraction.

Figure 5:
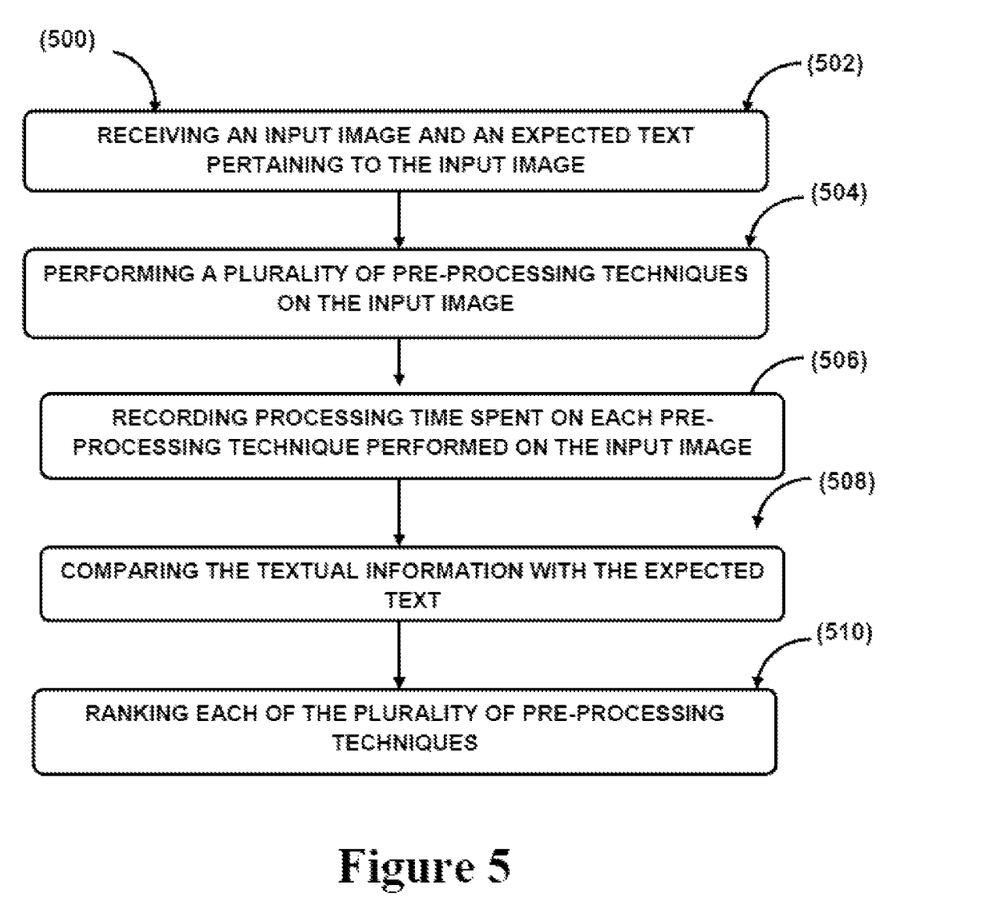
FIG. 5 illustrates a method for identifying at least one optimum pre-processing technique for text extraction, in accordance with an embodiment of the present subject matter.

Referring now to FIG. 5, a method 500 for identifying at least one optimum pre-processing technique for text extraction is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented as described in the system 102.

At block 502, an input image and an expected text pertaining to the input image may be received. In one implementation, the input image and the expected text pertaining to the input image may be received by a data receiving module 212.

At block 504, a plurality of pre-processing techniques may be performed on the input image in order to extract textual information present in the input image. In one aspect, the textual information may be extracted by using at least one text extraction technique. In one implementation, the plurality of pre-processing techniques may be performed on the input image by a performance module 214.

At block 506, processing time spent may be recorded for each pre-processing technique performed on the input image. In one implementation, the processing time spent may be recorded by the recording module 216.

At block 508, the textual information may be compared with the expected text. In one implementation, the textual information may be compared with the expected text by a comparison module 218.

At block 510, each of the plurality of pre-processing techniques may be ranked based on a result of comparison between the textual information and the expected text. In one implementation, each of the plurality of pre-processing techniques may be ranked by the ranking module 220, thereby identifying at least one optimum pre-processing technique for text extraction.

Exemplary embodiments discussed above may provide certain advantages. Though not required to practice aspects of the disclosure, these advantages may include those provided by the following features.

Some embodiments enable a system and a method to guide a user to select at least one optimum pre-processing technique for text extraction.

Some embodiments enable a system and a method to identify a least time consuming pre-processing technique for the input image.

Some embodiments enable a system and a method to recommend a list of optimum pre-processing techniques, corresponding to the input image, for text extraction.

Some embodiments enable a system and a method to compare the result of one or more pre-processing technique with other pre-processing techniques corresponding to the input image.

Some embodiments enable a system and a method to train a database for selecting optimum pre-processing technique for the input image of any parameter.

Some embodiments enable a system and a method to reduce the time and effort in extraction of text from documents/images.

Although implementations for methods and systems for identifying at least one optimum pre-processing technique for text extraction have been described in language specific to structural features and/or methods, it is to be understood that the appended claims are not necessarily limited to the specific features or methods described. Rather, the specific features and methods are disclosed as examples of implementations for identifying at least one optimum pre-processing technique for text extraction.

The invention claimed is:

1. A method for identifying at least one optimum pre-processing technique for text extraction, the method comprising:
   receiving, by a processor, an input image and an expected text pertaining to the input image;
   performing, by the processor, each of a plurality of pre-processing techniques on the input image in order to extract textual information present in the input image, wherein the textual information is extracted by using at least one text extraction technique;
   recording, by the processor, processing time spent on each pre-processing technique performed on the input image;
   comparing, by the processor, the textual information with the expected text; and
   ranking, by the processor, each pre-processing technique based on a result of the comparison and the processing time recorded thereby identifying at least one optimum pre-processing technique for text extraction, wherein the ranking is performed according to a matching percentage of the textual information to the expected text corresponding to each of the pre-processing technique, wherein each of the performing, the recording, and the ranking are performed iteratively when the result of comparing is below a threshold of the matching percentage.

2. The method of claim 1, wherein the result indicates an amount of textual information matched with the expected text for each pre-processing technique when performed on the input image.

3. The method of claim 1 further comprises storing one or more pre-processing techniques, as identified based on the result of comparison, corresponding to the input image, wherein the one or more pre-processing techniques, of the plurality of pre-processing techniques, are stored so as to perform at least one of the one or more pre-processing techniques on another image having a parameter same as the input image.

4. The method of claim 3, wherein the input image comprises image list, cropped image, cluster of images and others, wherein one input image is different from another input image based upon a parameter of the input image, wherein the parameter comprises luminosity, pixel density, brightness, color band, haziness, and quality.

5. The method of claim 2, wherein a pre-processing technique, of the plurality of pre-processing techniques, is ranked and identified as an optimized pre-processing technique according to the ranking, when the first ranking is assigned to the pre-processing technique having the amount greater than other amounts associated to other pre-processing techniques and the processing time is less than other processing times associated to the other pre-processing techniques.

6. A system (102) for identifying at least one optimum pre-processing technique for text extraction, the system comprising:
   a processor (202); and
   a memory (206) coupled to the processor, wherein the processor (202) is capable of executing a plurality of modules (208) stored in the memory (206), and wherein the plurality of modules (208) comprising:
   a data receiving module (212) executed by the processor (202), for receiving an input image and an expected text pertaining to the input image;
   a performance module (214) executed by the processor (202), for performing each of a plurality of pre-processing techniques on the input image in order to extract textual information present in the input image, wherein the textual information is extracted by using at least one text extraction technique;
   a recording module (216) executed by the processor (202), for recording processing time spent on each pre-processing technique performed on the input image;
   a comparison module (218) executed by the processor (202), for comparing the textual information with the expected text; and
   a ranking module (220) executed by the processor (202), for ranking each pre-processing technique based on a result of the comparison, and the processing time recorded, thereby identifying at least one optimum pre-processing technique for text extraction, wherein the ranking is performed according to a matching percentage of the textual information to the expected text corresponding to each of the pre-processing technique, wherein each of the performing, the recording, and the ranking are performed iteratively when the result of comparing is below a threshold of the matching percentage.

7. The system of claim 6, wherein the result indicates an amount of textual information matched with the expected text for each pre-processing technique when performed on the input image.

8. The system of claim 6 further comprises further comprises storing one or more pre-processing techniques, as identified based on the result of comparison, corresponding to the input image, wherein the one or more pre-processing techniques, of the plurality of pre-processing techniques, are stored so as to perform at least one of the one or more pre-processing techniques on another image having a parameter same as the input image.

9. The system of claim 8, wherein the input image comprises image list, cropped image, cluster of images and others, wherein one input image is different from another input image based upon a parameter of the input image, wherein the parameter comprises luminosity, pixel density, brightness, color band, haziness, and quality.

10. The system of claim 7, wherein a pre-processing technique, of the plurality of pre-processing techniques, is ranked and identified as an optimized pre-processing technique according to the ranking, when first ranking is assigned to the pre-processing technique is having the amount greater than other amounts associated to other pre-processing techniques and the processing time is less than other processing times associated to the other pre-processing techniques.

11. A non-transitory computer readable medium embodying a program executable in a computing device for identifying at least one optimum pre-processing technique for text extraction, the program comprising a program code:
   a program code for receiving an input image and an expected text pertaining to the input image;
   a program code for performing each of a plurality of pre-processing techniques on the input image in order to extract textual information present in the input image, wherein the textual information is extracted by using at least one text extraction technique;
   a program code for recording time required for performing each of a plurality of pre-processing techniques;
   a program code for comparing the textual information with the expected text; and
   a program code for ranking each pre-processing technique based on a result of comparison between the textual information and the expected text, and the processing time, thereby identifying at least one optimum pre-processing technique for text extraction, wherein the ranking is performed according to a matching percentage of the textual information to the expected text corresponding to each of the pre-processing technique, wherein each of the performing, the recording, and the ranking are performed iteratively when the result of comparing is below a threshold of the matching percentage.

12. The method as claimed in claim 1, wherein the one or more pre-processing techniques are be ranked based upon the predefined threshold of the matching percentage, wherein the one or more pre-processing techniques with the matching percentage greater than the threshold are identified as the optimum pre-processing techniques for text extraction.

13. The method as claimed in claim 1, comprising:
   generating a report comprising the one or more pre-processing techniques ranked based upon the predefined threshold of the matching percentage and the processing time recorded, wherein the input image and the expected text pertaining to the input image are updated based on the report stored in the cloud server, wherein the report is provided as an input for training the system for every input image having one or more different parameters, wherein the system once trained is configured to identify at least one optimum pre-processing technique, based on the report generated, for the corresponding input image with the parameter similar to a new input image.

14. The system as claimed in claim 6, wherein the one or more pre-processing techniques are be ranked based upon the predefined threshold of the matching percentage, wherein the one or more pre-processing techniques with the matching percentage greater than the threshold are identified as the optimum pre-processing techniques for text extraction.

15. The system as claimed in claim 6, wherein the processor is configured to:
 generate, a report comprising the one or more pre-processing techniques ranked based upon the predefined threshold of the matching percentage and the processing time recorded, wherein the input image and the expected text pertaining to the input image are updated based on the report stored in the cloud server, wherein the report is provided as an input for training the system for every input image having one or more different parameters, wherein the system once trained is configured to identify at least one optimum pre-processing technique, based on the report generated, for the corresponding input image with the parameter similar to a new input image.

\* \* \* \* \*